Nov. 4, 1958
H. C. WINKEL
2,858,931
BATTERY GRID TRIMMING MACHINE
Filed May 23, 1955
2 Sheets-Sheet 1
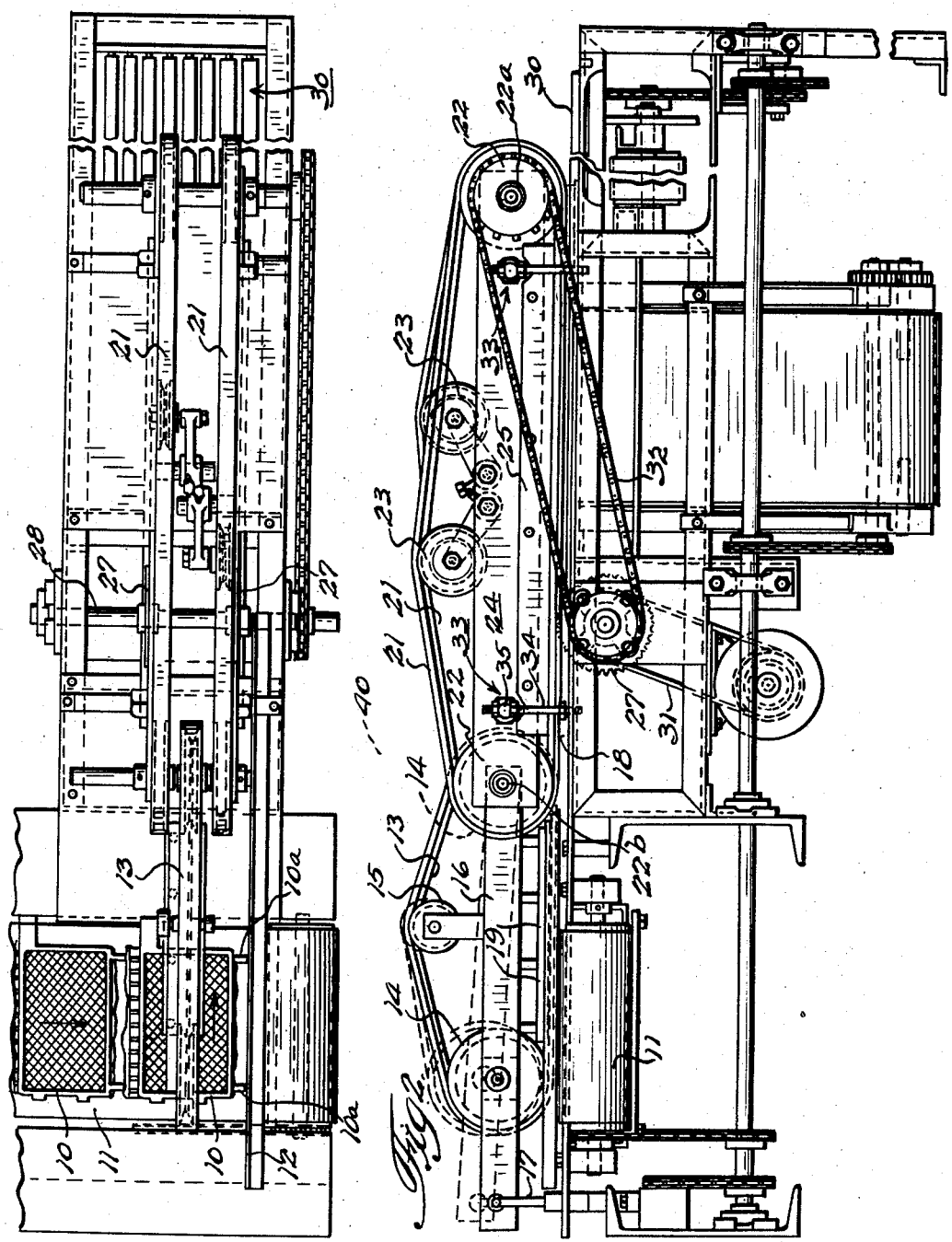
INVENTOR.
Herbert C. Winkel.

Nov. 4, 1958 H. C. WINKEL 2,858,931
BATTERY GRID TRIMMING MACHINE
Filed May 23, 1955 2 Sheets-Sheet 2

INVENTOR.
Herbert C. Winkel
BY
Thiess, Olsen, Mecklenburger,
von Holst, & Coltman.

United States Patent Office 2,858,931
Patented Nov. 4, 1958

2,858,931

BATTERY GRID TRIMMING MACHINE

Herbert C. Winkel, Watervliet, Mich.

Application May 23, 1955, Serial No. 510,452

1 Claim. (Cl. 198—160)

This invention relates to a battery grid trimming machine, and it is an object of the invention to provide improved apparatus of that character.

In accordance with present practice, a pouring gate or gates and the inevitable flashing adhering to battery grids as cast have been removed by reciprocating blades which are akin to paper cutters in operation. The battery grids, if cast double, as is common in the art, may be positioned for trimming by engagement of the laterally protruding terminals with fixed guide means. Alternatively, and in accordance with applicant's Patents Nos. 2,621,219 and 2,638,982, locating lugs or other stop engaging portions may be cast on the leading edge of a single or double grid and so arranged as to engage a fixed guide means. Whichever means is employed for locating the battery grids with respect to the trimming knives, it is recognized that such trimming means has material disadvantages. One of these is that such trimming apparatus tends to crush the upper surface of the grid adjacent the cut and to tear the lower surface, leaving a jagged edge on the battery grid.

In accordance with the present invention, successive battery grids are conveyed along a platform in a direction parallel to the desired trim lines and are carried past a power saw or saws (preferably circular saws), whereby the gates and/or flashing are sawed off.

It has been found that sawing the excess material from battery grids has the advantage of providing a much cleaner line of severance than reciprocating knives, as well as being a continuous rather than an intermittent operation. A battery grid trimming machine constructed in accordance with the present invention incorporates a power saw for trimming battery grids and includes apparatus which solves various problems attending this improved method of trimming battery grids.

It is another object of the invention to provide an improved battery grid trimming machine in which the pouring gates and/or flashing are removed by a power saw.

It is another object of the invention to provide improved battery grid trimming apparatus incorporating novel means for advancing grids to a power saw or saws.

It is another object of the invention to provide improved battery grid trimming apparatus of the character suggested above while being reliable, efficient and economical to manufacture.

This invention, together with further objects and advantages thereof, will best be understood by reference to the following description taken in connection with the accompanying drawings and its scope will be pointed out in the appended claim.

In the drawings, in which like parts are designated by like reference numerals,

Figure 1 is a plan view of battery grid trimming apparatus illustrating one embodiment of the invention;

Fig. 2 is an elevational view of the apparatus of Fig. 1;

Untrimmed battery grid castings 10 are shown in the upper left-hand corner of Fig. 1 being fed seriatim to the trimming apparatus by an endless conveyor belt 11. This belt may advance continuously, forward advance of the untrimmed grids 10 being halted by engagement of the grids with a stop or railing 12, best seen in Figs. 1 and 3.

Figures 4, 5:
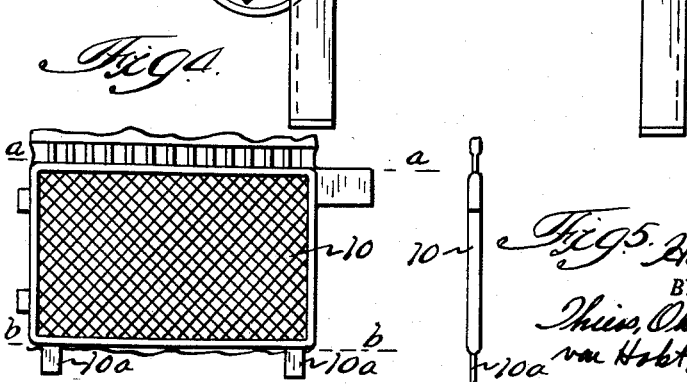
Fig. 4 is a face view of an untrimmed battery grid casting having characteristics making it particularly suitable for trimming by the apparatus of Figs. 1, 2 and 3.
Fig. 5 is an edge view of the same grid casting.

In the particular embodiment of the invention shown in the drawings, it is desirable that each grid casting have a true edge or surface on its leading edge in order that each grid may be properly aligned by the railing 12 for subsequent trimming. The grids shown in the drawings are cast in a form as disclosed in applicant's Patents Nos. 2,621,219 and 2,638,982. Referring to Fig. 4, it will be seen that the grid casting 10 has a pair of lugs 10a which protrude forwardly beyond any reasonable flashing that may appear on the forward edge of the grid. It has been found that these lugs may be formed with little or no flashing thereon. Furthermore, any flashing on the forward edge of these lugs is very fragile because of the fact that the lugs are quite narrow, with the result that any such flashing is readily bent or crushed by even very light pressure or impact of the grid against a hard surface, such as the railing 12. Accordingly, the lugs 10a serve to provide a true leading edge, in spite of the flashing which may appear over most of the length of the forward edge of the grid proper, whereby each successive grid may be properly positioned by engagement of the lugs 10a with the railing 12. It will be understood that the lugs 10a constitute only one possibility for providing an adequate stop engaging portion for providing the functional equivalent of a true edge on the forward edge of the grid casting.

In Fig. 4 the dotted lines a—a and b—b indicate the lines along which the casting is to be trimmed. Trimming along the line a—a removes the pouring gates plus flashing, and trimming along the lines b—b eliminates flashing at the lower edge along with the lugs 10a. The grids 10 as positioned by the railing 12 in Fig. 1 are so arranged that the lines a—a and b—b are aligned with circular saws, subsequently to be described.

Figure 3:
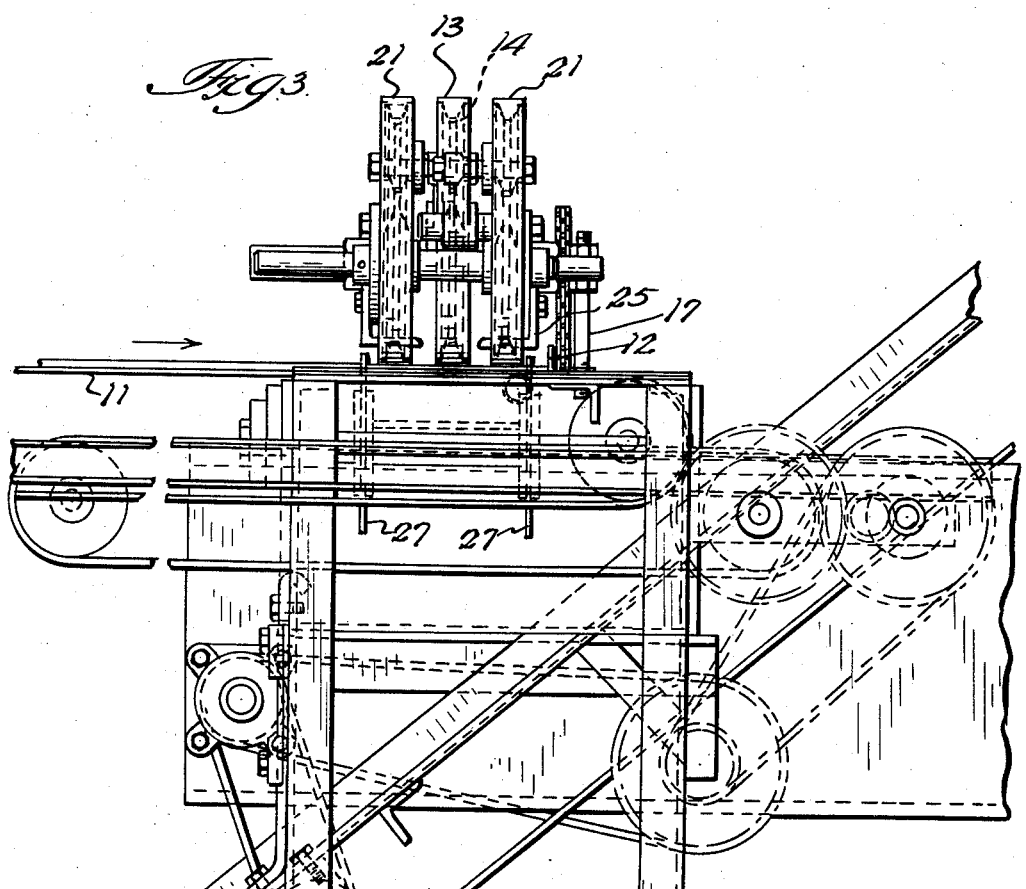
Fig. 3 is an end view of the same apparatus.

As the grids 10 come into engagement with the railing 12, they are located immediately below a continuous flexible belt 13 which travels over a pair of wheels 14 and an idler wheel 15. The belt 13 is preferably a V-belt, as indicated in Fig. 3, and the outer surface thereof is composed of a soft or spongy rubber-like material. One commercial form of belt found to be suitable in this application is the Browning V-belt B-90.

The axles of the two wheels 14 are connected by a bar 16 which is pivotable about the axis of the right hand wheel 14 as viewed in Fig. 2. At the left-hand end of the bar 16, beyond the left-hand wheel 14, is a vertical link 17 pivotally connected to the bar 16. The link 17 is preferably power driven to raise and lower the left-hand end of the bar 16 and hence to raise and lower the left-hand belt wheel 14. Since the drive means does not constitute a feature of the invention in itself, it is not described in detail herein. It is believed to be sufficient for the purpose of the present disclosure to point out that the link 17 raises the bar 16 and the left-hand wheel 14 during the time that the conveyor belt 11 is advancing a battery grid 10 into engagement with the railing 12. Subsequent to such engagement, the link 17 lowers the bar 16, and hence the belt 13, into contact with the grid 10. Since the outer portion of the belt 13 is of soft material, it is well adapted to grasp the grid 10. More particularly, the outer portion of the belt presses down into the openings in the grid and thereby obtains a firm grip on the grid, much the same as a human hand may obtain a firm grip merely by downward pressure against the network construction of the grid.

The belt 13 is continuously power driven in a counterclockwise direction, as viewed in Fig. 2, whereupon engagement of the belt with the grid results in movement of the grid to the right as viewed in Figs. 1 and 2. As the grid is thus moved to the right, it passes off the conveyor 11 onto a stationary platform 18 and along the platform to the right. Since the belt 13 has a firm grip on the battery grid and moves parallel to the railing 12, the grid is maintained in proper position as it travels, the lugs 10a remaining in contact with the railing 12. It should be noted that a guide member 19 is secured to the bar 16 and bears against the inner surface of the belt 13 whereby that portion of the belt 13 which extends between the lower portions of the wheels 14 is made to travel along a straight line and is thereby maintained in firm contact with the upper surface of the grid 10.

As each successive grid 10 is advanced to a point under the wheel 14, it is brought into contact with the lower surfaces of two similar belts 21, these belts being arranged at opposite sides of the belt 13 and traveling in a counterclockwise direction as viewed in Fig. 2. The belts 21 pass over pairs of wheels 22 as well as idler wheels 23. Preferably the left-hand wheels 22 are arranged on the same axis as the right-hand wheel 14 for the belt 13. It is thereby provided that the belt 13 brings successive grids 10 into contact with the belts 21 before passing upwardly over its right-hand wheel 13 and out of contact with the grid 10. The axes of the wheels 22 are connected and spaced apart by bars 24, and guide members in the form of an angle iron 25 are secured to the bars 24 and engage the inner surface of the belts 21. The belts are thereby held firmly in contact with the grids 10 as they drag the grids along the platform 18.

As the grids 10 are slid along the platform 18 by the belts 21, they are dragged through a pair of circular saws 27 shown in Figs. 1, 2 and 3. These saws are preferably adjustable along their drive shaft 28 and in any event are so positioned with respect to the railing 12 that they sever the grids along the desired parting lines a—a and b—b of Fig. 4. Following the sawing of the grids along the desired lines, the trimmed grids are carried further to the right and may, for example, be dropped onto a conveyor 30 for ultimate disposition.

It will now be apparent that untrimmed battery grids fed to one end of the machine are moved along the platform 18 such that the saw or saws 27 may trim off the undesired portions of the successive battery grids. As the belt 13 is lowered to engage a given battery grid, that grid is moved to the right, in Figs. 1 and 2, along the platform 18. At such time as the grid is brought into contact with the belts 21, the belt 13 may be raised by the operation of the link 17 such that a second battery grid may be moved forwardly by the conveyor belt 11 into engagement with the railing 12. When the belt 13 is again lowered by operation of the link 17, the next battery grid is advanced along the platform 18. Repeated raising and lowering of the belt 13 thereby feeds successive grids to the belts 21 as long as the conveyor 11 feeds successive battery grids into the proper position below the belt 13.

The belts 21 bear down on the grids 10 fed thereto by the belt 13 and slide them further along the platform 18 and past the saw or saws 27, and ultimately dispose of the trimmed grids, the grids being deposited on the conveyor 30 in the illustrated embodiment of the invention.

In Fig. 2 there is shown a main drive belt 31 which drives the shaft 28 and the saws 27. A second drive belt 32 is driven by the shaft 28 and in turn drives the shaft 22a upon which the right-hand pulleys 22 are arranged.

The belts 21 may thereby drive the left-hand pulleys 22 and the shaft 22b on which they are mounted. This shaft in turn drives the right-hand pulley 14 and the belt 13. The conveyor belt 11 which feeds untrimmed grids to the machine and the link 17 which raises and lowers the belt 13 may be driven by the same common power source, as shown in Fig. 2. Since the particular arrangement of the over-all driving means may be of conventional form and does not of itself constitute a feature of the present invention, it is not described in detail herein.

It will be noted that the bars 24, on which the pulley wheels 22 and the right-hand pulley wheel 14 are rotatably mounted, are adjustably positioned relative to the platform 18 by the assemblies 33 which may be of conventional construction. More particularly, a threaded rod 34 passes through an eye 35 which is secured to the bar 24. A pair of nuts which threadedly engage the rod 34 may be rotated to adjust the height of the bar. This apparatus permits accurate vertical positioning of the belts 21 and of the right-hand end of the belt 13 to provide proper pressure of the belts against the upper surfaces of the grids 10 as they pass along the platform 18. The link 17 may also be of adjustable length to provide the desired pressure of the left-hand end of the belt 13 against the grids.

If it is desired to trim the battery grids along two edges, two saws 17 may be employed as illustrated in the drawings. A single saw 27 may, of course, be employed if only one edge is to be trimmed. The saw or saws are preferably adjustably positioned on the shaft 28 to provide for trimming grids of different dimensions. The railing 12 may also be adjustably positioned to adapt the machine to different sizes of grids.

It has been found that where there is a substantial distance between the pulleys or rollers over which the V-belt or other desired form of belt passes, some guide means are required in addition to the pulleys or rollers. In the illustrated embodiment of the invention, fixed rails 19 and 25 are disclosed. It will be apparent that these might be replaced by additional pulleys or rollers which might be mounted on the bars 16 and 24. The essence of this feature of the invention is that sufficient guide means, including the main pulleys or rollers and any necessary additional pulleys, rollers or fixed elements, are provided to maintain the belt or belts in firm contact with the grids as they move along the platform 18.

It will also be noted that in the particular embodiment of the invention disclosed in the drawings, the belt or belts 21 are separate from the belt 13 whereby raising and lowering of one end of the belt 13 does not interrupt contact of the belt or belts 21 with grids which have once been advanced into contact therewith. However, a single belt means might be employed replacing the dual belt system disclosed in the drawings. Such belt means could extend from the right-hand pulley 22 to the left-hand pulley 14 and back under an intermediate pulley arranged on the axle 22b. As the left-hand pulley 14 is raised and lowered carrying any guide means 19 therewith, only that portion of the single belt means extending from the left-hand pulley 14 to the axle 22b would be raised and lowered, the remaining portion of the single belt means extending from the axle 22b to the right-hand pulley 22 and any additional guide means arranged therebetween remaining at a fixed elevation. With such an arrangement, if the left-hand pulley 14 were to be raised a sufficient distance that it would otherwise significantly lessen the tension on the single belt means, an idler roller should be placed above the pulley on the shaft 22b as suggested by the roller 40 shown in phantom lines in Fig. 2.

In Fig. 5 it may be seen that the upper and lower edges of the battery grid proper are rounded. This feature of the grid reduces the tendency of insulation to be cut by contact with the grid. If grids are cast with such rounded edges and are subsequently trimmed by reciprocating shear blades, the side of the grid which contacts a shear blade (usually a platform with a machined edge) tends to flatten the soft material of the battery grid closely adjacent the shear line flowing toward that blade, with the result that the rounded edge as cast is reduced to a sharp edge. The desired rounded edge is thereby lost.

As opposed to this, if the battery grids are cast with rounded edges as illustrated in Fig. 5 and the grids are subsequently sawed, it has been found that the trimmed grid retains its rounded edges. Accordingly battery trimming apparatus such as that disclosed in the drawings and described herein not only produces a smoother cut but substantially eliminates the distortion of the remaining grid which inevitably results from trimming by shear blades.

Alternatively, the grids may be cast with square edges and the sharp edges may be milled or merely scraped after trimming. Rotating milling tools or simple, fixed scrapers may be arranged on or extend through the platform 18 and be so located as to engage and bevel off the trimmed edges of the grids as the grids are carried beyond the saws 27 by the belts 21.

In the specific and preferred embodiment disclosed herein, a continuous belt or belts are recommended for bearing against the grids to slide them along the platform. Alternatively, a reciprocating member with a soft resilient face may be employed for this purpose. Suitable control apparatus should be provided in such case which would raise the reciprocating member at least near the end of its return stroke such that a grid might be received thereunder. Since the design and construction of such an alternative embodiment is believed to lie within the ability of one skilled in the art, it is not disclosed in further detail herein.

Further modifications will be apparent to those skilled in the art and it is desired, therefore, that the invention be limited only by the scope of the appended claims.

Having thus described my invention, what I claim and desire to secure by Letters Patent is:

In a battery grid trimming machine having a platform along which untrimmed battery grids may be fed to a work station associated with said platform, continuous flexible belt means arranged immediately above said platform, guide means for maintaining said belt means in such position as to bear down against battery grids on said platform, said belt means having soft outer surface portions capable of firmly gripping the upper broad surface of battery grids lying on said platform, whereby said grids may be held firmly against said platform and slid firmly along said platform by said belt means to such work station, said guide means permitting raising and lowering of one end portion of said belt means while maintaining another portion of said belt means in grid-engaging position with respect to said platform, and means for raising and lowering said one end portion of said belt means whereby said one end portion may readily receive a grid thereunder when raised and may slide said grid to said other portion of said belt means when lowered.

References Cited in the file of this patent

UNITED STATES PATENTS

| | | |
|---|---|---|
| 698,111 | Gale | Apr. 22, 1902 |
| 1,642,287 | Zuckerman | Sept. 13, 1927 |
| 1,863,303 | Goad | June 14, 1932 |
| 1,985,850 | Beardsley | Dec. 25, 1934 |
| 2,028,236 | Needham | Jan. 21, 1936 |
| 2,195,371 | Moore | Mar. 26, 1940 |
| 2,362,079 | McCann et al. | Nov. 7, 1944 |
| 2,554,095 | Diezel | May 22, 1951 |
| 2,647,612 | Sticelber | Aug. 4, 1953 |
| 2,672,931 | Maher | Mar. 23, 1954 |
| 2,699,944 | Keesling | Jan. 18, 1955 |